(12) United States Patent
Anderson et al.

(10) Patent No.: US 6,402,390 B1
(45) Date of Patent: Jun. 11, 2002

(54) V-GROOVE ADAPTERS FOR INTERCONNECTING OPTICAL CONDUCTORS

(75) Inventors: Jerry M. Anderson, Austell; Muhammed A. Shahid, Snellville; Daniel L. Stephenson, Lilburn, all of GA (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 09/210,923

(22) Filed: Dec. 14, 1998

(51) Int. Cl.[7] ................................................. G02B 6/38
(52) U.S. Cl. ........................................ 385/71; 385/72
(58) Field of Search .............................. 385/65, 55, 58, 385/59, 60, 70, 71, 72

(56) References Cited

U.S. PATENT DOCUMENTS

| | | |
|---|---|---|
| 4,775,401 A | 10/1988 | Fleming et al. |
| 4,950,048 A | * 8/1990 | Kakii et al. ................. 350/96.2 |
| 5,287,426 A | 2/1994 | Shahid |
| 5,388,174 A | 2/1995 | Roll et al. |
| 5,530,709 A | 6/1996 | Waarts et al. |
| 5,603,870 A | 2/1997 | Roll et al. |
| 5,621,834 A | 4/1997 | Anderson et al. |
| 5,632,908 A | 5/1997 | Shahid |
| 5,639,387 A | 6/1997 | Shahid |
| 5,857,049 A | 1/1999 | Beranek et al. |
| 6,064,786 A | 5/2000 | Cunningham et al. |

* cited by examiner

Primary Examiner—Frank G. Font
Assistant Examiner—Roy M. Punnoose
(74) Attorney, Agent, or Firm—Alston & Bird LLP

(57) ABSTRACT

A V-groove adapter for interconnecting optical conductors includes V-grooves that are precisely aligned with respect to one another to provide a desired alignment of the respective cores of the optical conductors received within the respective V-grooves. By controlling the widths of the respective V-grooves and the axial alignment of the V-grooves with respect to one another, the cores of the optical conductors received within the respective V-grooves can be coaxially aligned or offset by predetermined distance with repeatable precision on the order of 1 $\mu$m. The V-grooves are initially fabricated in a monocrystalline material. A metal layer is formed over the V-grooves in order to form an inverse replica of the V-grooves which is used as an insert in an injection mold so that the V-groove adapters can be mass produced using injection molding techniques.

8 Claims, 8 Drawing Sheets

V-GROOVE ADAPTERS FOR INTERCONNECTING OPTICAL CONDUCTORS

TECHNICAL FIELD

The present invention generally relates to optical fibers, and more specifically, to the interconnection of two optical conductors.

BACKGROUND OF THE INVENTION

Fiber optic networks are being deployed at an ever-increasing rate due, at least in part, to the large bandwidth provided by fiber optic cables. Inherent with any fiber optic network design is the need to connect individual optical fibers to other optical fibers and to equipment. A common technique for connecting optical fibers is by terminating an optical fiber with a ferrule, and bringing the ferrule into a mating relationship with another ferrule terminating a second fiber. The ferrules are precisely aligned by a cylindrical sleeve which receives two ferrules of similar size and coaxially aligns the longitudinal axes of the respective cores thereof. The sleeve is typically a component of a coupler or adapter which securely couples together the plug housings of the respective optical fibers. Examples of such connection systems can be found in U.S. Pat. Nos. 4,738,507 and 4,738,508, both issued to Palmquist and assigned to the assignee of the present invention.

Recent advancements have led to the design of smaller optical fiber connection systems which utilize smaller diameter ferrules. The smaller ferrules offer the advantages of being more proportional in size to the fiber optic cable, offering improved axial alignment, and being more space efficient. In particular, the relatively smaller connectors can be more densely packed at the face of a piece of network equipment, and therefore, may provide more efficient space management.

The smaller connector design utilizes a ferrule that is 1.25 millimeters (mm) in diameter. An example of a smaller ferrule connector is the LC connector. Prior to the development of the smaller ferrule connectors, most connectors utilized ferrules that were 2.5 mm in diameter, which is twice the diameter of the ferrule of smaller ferrule connectors. An example of the larger ferrule connector includes the ST™ (a trademark of Lucent Technologies Inc.) connector.

While there are numerous advantages of using the smaller ferrule connectors, some of which are set forth above, there is a compatibility problem with many of the existing optical networks that utilize the larger ferrule connectors. The larger ferrule connectors have been utilized for several years, and have been expansively deployed in optical networks. It is cost prohibitive in most situations to replace existing optical fiber networks with new optical fibers utilizing the smaller ferrule connectors. Therefore, when performing equipment or hardware upgrades or installations to existing optical networks, wherein the new equipment or hardware is designed for use with a smaller ferrule connection and the existing equipment or hardware is designed for use with the larger ferrule connectors, the technician is faced with the problem of how to interconnect two optical terminations having ferrules of dissimilar sizes. Thus, a need exists in the industry for an efficient and cost-effective method for interconnecting two different sized ferrules in an optimized mating relationship.

One proposed solution is the use of hybrid cables which have a larger ferrule connector on one end and a smaller ferrule connector on the opposite end. While such hybrid cables provide a relatively straightforward solution, they are relatively cumbersome to use, require two connections in order to interface two optic fibers (i.e., adding an additional connection), and are relatively expensive. Yet another proposed solution is a step sleeve adapter which comprises a cylindrical sleeve having coaxially aligned bores of different sizes formed into opposite ends of the sleeve and meeting in the middle thereof. Accordingly, at approximately the middle of the step sleeve, the inside diameter of the sleeve, as defined by the bores, changes from a first inside diameter (corresponding to a smaller ferrule) to a second inside diameter (corresponding to a larger ferrule). This design requires precise sizing of the bores and the ferrules in order to establish and secure an accurate alignment of the ferrules within the sleeve. In practice, such precision is not consistently reproduced economically. Further, such step sleeves are typically made of a metal which has a high coefficient of thermal expansion thereby making the sleeve particularly sensitive to temperature changes. The step sleeve may be made of a ceramic material in the alternative, though a ceramic sleeve would be expensive to manufacture.

Therefore, an unsatisfied need exists in the industry for a low-cost connector for interconnecting optical conductors of dissimilar size with precision alignment of the respective cores thereof

SUMMARY OF THE INVENTION

The present invention provides for a V-groove adapter for interconnecting optical conductors of dissimilar sizes. For purposes of the present disclosure, an optical conductor can be, but is not limited to, a composite structure consisting of a connector ferrule into which an optical fiber has been set in and finished by, for example, polishing, or an optical fiber alone). Further, the references made herein to the dissimilar size of two optical conductors refers to the outside diameters of the respective optical conductors. A V-groove adapter in accordance with the present invention may comprise two axially aligned V-grooves of different predetermined dimensions (e.g., widths and depths) that are adapted to receive respective optical conductors, wherein the optical conductors are of different sizes. The V-grooves, which are part of an alignment member, support the two optical conductors in a predetermined aligned relationship, such as in axial alignment such that the respective cores of the optical conductors are coaxially aligned. Advantageously, the precise alignment of the two cores reduces the connection loss of the two optical fibers.

A V-groove adapter in accordance with the present invention can be mass produced using injection molding techniques, which are well-known and relatively low cost. The mold utilized in the injection molding is fabricated from a master V-block made of a monocrystalline material, such as silicon, that is prefabricated using masking and etching techniques commonly used in microelectronic device processing and fabrication. These techniques produce highly accurate features and can be precisely controlled to exacting dimensions. Thus, a V-groove adapter fabricated using an injection mold formed in accordance with the present invention can be inexpensively manufactured with a high degree of precision.

In accordance with an aspect of the present invention, an optical fiber adapter that aligns optical conductors comprises a first alignment member defining a first V-groove adapted to support therein a first optical conductor including a first central axis, and a second alignment member defining a second V-groove substantially axially aligned with the first V-groove and adapted to support therein a second optical conductor having a second central axis. The first V-groove and the second V-groove are configured to support the first and second optical conductors in a mating relationship which includes a predetermined alignment of the first and second central axes. The diameters of the first and second optical conductors may be different, and the first V-groove and the second V-groove may have different dimensions (e.g., width and depth) as necessary to provide the predetermined alignment. The predetermined alignment may include a coaxial alignment of the central axes, or an offset alignment of the central axes.

The width of a V-groove defines the height of the center of an optical conductor supported in the V-groove with reference to the top surface of the V-groove for an optical conductor of a given diameter. Accordingly, the width of the V-groove may be designed such that the V-groove coaxially aligns the central axis of the optical conductor with the central axis of the V-groove (which is at the top of the V-groove), or aligns the central axis of the optical conductor in an offset axial alignment with the central axis of the V-groove. If desired, a V-groove may comprise a trough or truncated cross section in order to preserve the structural portion of the connector beneath the V-groove, and to reduce the overall depth of the V-groove adapter.

In accordance with another aspect of the present invention, a method for making a mold for an optical fiber connector comprises the step of making a first V-groove of a first width and a second V-groove of a second width in a monocrystalline material, wherein the first V-groove and second V-groove are in a predetermined alignment with respect to one another. The resulting structure is referred to herein as a master V-block. A metal is deposited on the aligned first and second V-grooves, and then the monocrystalline material is removed to form a metal member having therein a negative impression of the aligned first and second V-grooves. The metal member is then used as a mold portion for making a V-groove adapter.

A method for making an optical fiber adapter comprises the steps of providing a mold defining a negative impression of a first V-groove and a second V-groove, wherein the first and second V-grooves are proximate one another and are disposed in a predetermined alignment with respect to one another. The mold is then used to form the optical fiber adapter having aligned third and fourth V-grooves, wherein each one of the third and fourth V-grooves is adapted to support therein an optical conductor so the respective optical conductors are in a predetermined axial alignment.

The predetermined alignment of the optical conductors may be coaxial alignment or offset alignment, as may be desired. Accordingly, the V-groove adapter may be utilized to interconnect two optical conductors which having different outside diameters. The V-groove adapter may be fabricated utilizing injection molding techniques so that the V-groove adapter can be mass produced. The V-groove adapter preferably comprises plastic material. In order to account for the shrinkage in the plastic during the injection molding process, the first and second V-grooves of the mold may be made slightly larger than the third and fourth V-grooves of the resulting adapter.

In accordance with another aspect of the present invention, an optical attenuator comprises a first alignment member defining a first V-groove of a first width, wherein the first V-groove is adapted to support therein a first optical conductor, and a second alignment member defining a second V-groove of a second width, wherein the second V-groove is adapted to support a second optical conductor. The first and second V-grooves are configured to support the first and second optical conductors in an axial alignment with respect to one another that is slightly offset. The axial offset may be lateral or vertical or both, and is precisely controlled to provide a predetermined loss in the optical signal passing from the emitting optical conductor to the receiving optical conductor. By precisely controlling the widths of the first and second V-grooves, optical conductors of the same or different diameters may be interconnected by an optical attenuator in accordance with the present invention.

In accordance with yet another aspect of the present invention, an optical fiber adapter for establishing an offset launching condition of an optical signal from a single-mode fiber to a multimode fiber comprises a first alignment member defining a first V-groove of a first width, wherein the first V-groove is adapted to support therein an optical conductor having a multimode core, and a second V-groove of a second width, wherein the second alignment member defining a second V-groove is adapted to support therein a second optical conductor having a single-mode core. The first V-groove and the second V-groove are axially offset by a predetermined amount with respect to one another so that the optical signal injected from the single-mode core into the multimode core underfills the optical modes of the multimode core. The axial offset may be lateral, vertical or in between.

Other features and advantages of the present invention will become apparent to one skilled in the art upon examination of the following drawings and detailed description. It is intended that all such features and advantages be included herein within the scope of the present invention as defined by the appended claims.

BRIEF DESCRIPTION OF THE DRAWINGS

The present invention can be better understood with reference to the following drawings. The elements of the drawings are not necessarily drawn to scale, emphasis instead being placed upon clearly illustrating the principles of the present invention. Furthermore, like reference numerals designate corresponding parts throughout the several views.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1A:
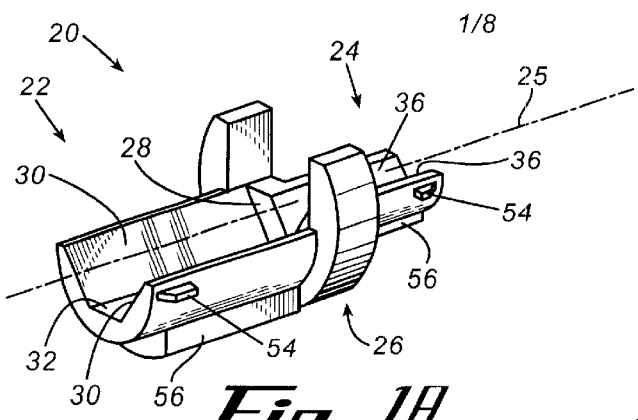
FIGS. 1A and 1B are a left side perspective view and a right side perspective view, respectively, of a V-groove adapter in accordance with an embodiment of the present invention.
Figure 1B:
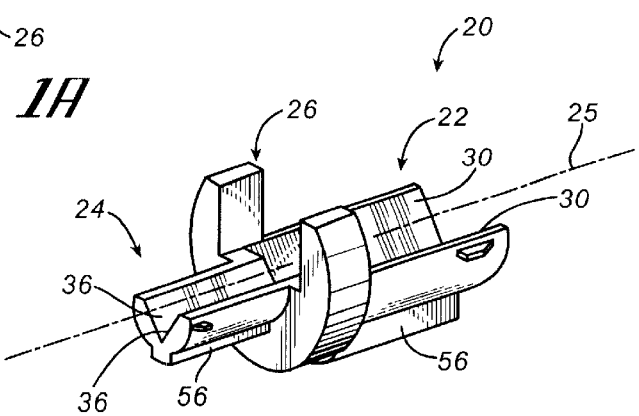

A V-groove adapter 20 in accordance with an embodiment of the present invention for interconnecting optical conductors of dissimilar size is illustrated in FIGS. 1A and 1B. The V-groove adapter 20 may operate independently to interconnect two optical conductors, or the V-groove adapter 20 may be incorporated into a coupler of a optical fiber connection system, as described in the "Background of the Invention" section. In such a connection system, optical fiber terminations having different sized ferrules may be optically interconnected utilizing a coupler having a V-groove adapter in accordance with the present invention instead of a cylindrical sleeve. It is noted that for purposes of the present disclosure, an optical conductor can be any device suitable for transmitting optical signals, such as, but not limited to, optical ferrules or optical fibers. Further, the dissimilar size referenced herein refers to the outside diameters of the respective optical conductors.

The V-groove adapter 20 comprises a larger V-groove 22 and an adjacent smaller V-groove 24. The larger V-groove 22 and the smaller V-groove 24 are disposed proximate one another so as to be longitudinally aligned along a common central axis 25. The larger V-groove 22 and the smaller V-groove 24 interface with one another at a structural member 26, thereby forming a transverse surface 28. The structural member 26 may take any suitable shape such as the substantially U-shaped illustrated, or a circular shape (not shown) with a central bore through which the optical conductors are interconnected. The larger V-groove 22 is defined by opposing reference facets 30 and a bottom surface 32. The larger V-groove 22 is adapted to support therein a first optical conductor, as described in greater detail below. Likewise, the small V-groove 24 is defined by opposing reference facets 36, which are adapted to support therein a second optical conductor, as described in greater detail below.

Figure 2A:
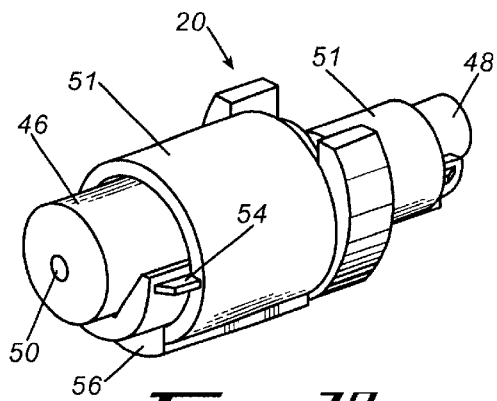
FIGS. 2A and 2B are a left perspective view and a right perspective view, respectively, of two optical conductors being interconnected by the V-groove adapter illustrated in FIGS. 1A and 1B.
Figure 2B:
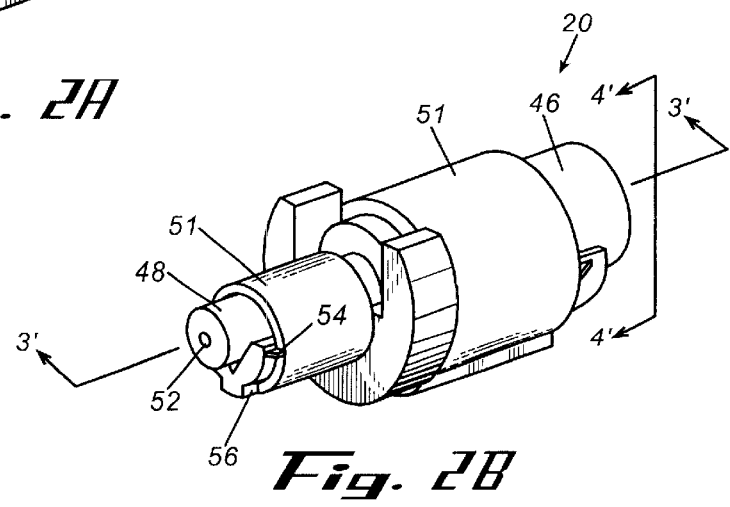

With reference to FIGS. 2A and 2B, the V-groove adapter 20 is shown in use, wherein a first optical conductor 46 and a second optical conductor 48 are optically interconnected such that the core 50 of the first optical adapter 46 and the core 52 of the second optical conductor 48 are coaxially aligned. The first optical conductor 46 and the second optical conductor 48 are held in place by respective securing mechanisms 51, such as a leaf spring, clamp, or a cantilever arm secured to the structural member 26 and extending over the optical conductor. Specifically, the securing mechanisms 51 press the optical conductors 46, 48 against the reference facets 30, 36, respectively. The securing mechanisms 51 are held in place by detents 54 and sprig guides 56.

When the V-groove adapter 20 is utilized to interconnect optical ferrules of dissimilar size, wherein each ferrule is part of an optical fiber termination, the ferrules are axially loaded by spring mechanisms or the like built into the plug housings which maintain contact between the planar end surfaces of each ferrule, and hence, maintain optical communication. For example, the axial loading provided in a smaller ferrule adapter such as an CL connector is approximately 1 lb. of force, while the axial loading provided in larger ferrule connectors such as an ST™ connector is approximately 2 lbs. of force. As a result, the larger ST™ ferrule may be forced against transverse surface 40 (FIG. 1A) while the axial loading on the smaller CL ferrule maintains contact between the end surfaces of the two ferules at a plane of contact, which is transverse to the longitudinal axis of the respective ferrules.

Figure 3:
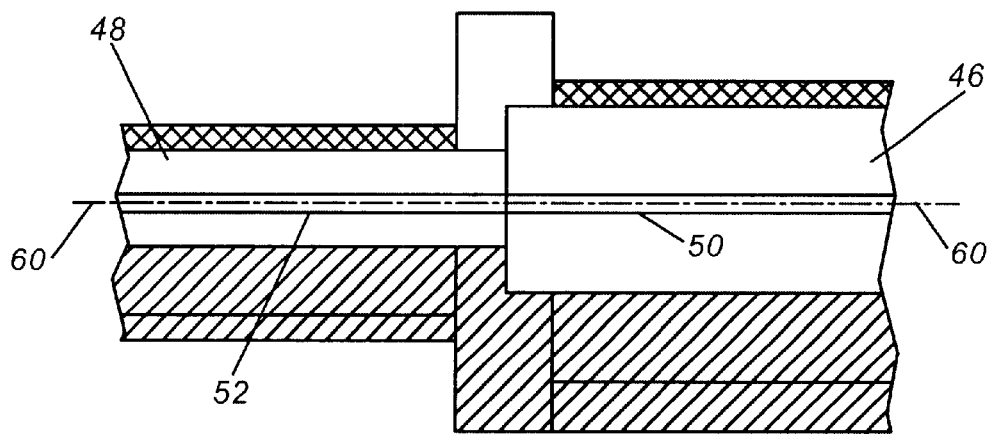
FIG. 3 is a fragmentary cross-sectional view of the interconnection of the two optical conductors in FIG. 2B as taken along lines 3'—3' of FIG. 2B.

A cross-sectional view of the interconnection between the first optical conductor 46 and second optical conductor 48 is provided in FIG. 3. The securing mechanisms 51 are not illustrated in order to simplify the illustration. In accordance with the present invention, the cores 50, 52 are coaxially aligned by the V-groove adapter 20 such that the cores 50, 52 have a common longitudinal axis 60. Current fabrication techniques, as described below, are capable of producing V-groove adapters that can align the cores 50, 52 within 1 μm of accuracy. It is expected, however, that advancements in manufacturing techniques and materials will provide even greater precision in the future. Nonetheless, core alignment within 1 μm is more than sufficient for many current applications.

Figure 4:
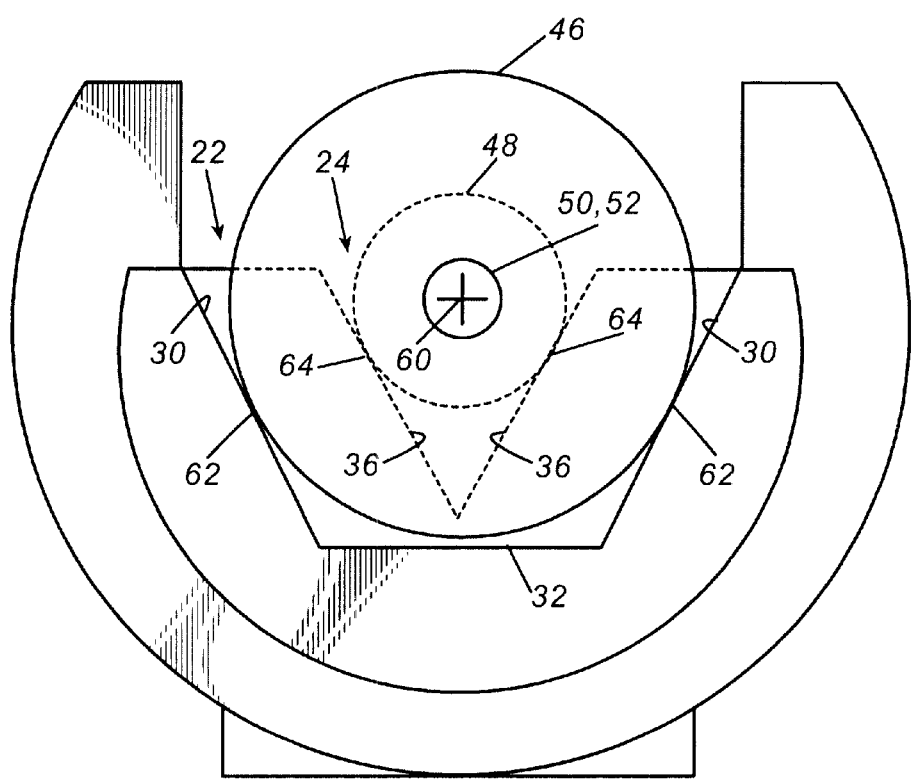
FIG. 4 is a right side elevational view of the V-groove adapter of FIG. 2B taken along lines 4'—4' thereof, wherein the axial alignment of the two optical conductors is illustrated.

FIG. 4 provides a right side view of the V-groove adapter illustrated in FIG. 2B. The securing mechanisms 51 are not illustrated in order to simplify the illustration. As shown, the cores 50, 52 are coaxially aligned along the longitudinal axis 60. The precise alignment of cores 50, 52 is achieved by configuring the V-grooves 22, 24 to support the optical conductors 46, 48, respectively, so that their central axes are at a common predetermined height. In the embodiment presented, the reference facets 30 are configured to provide two lines of contact 62 that support the optical conductor 46 so that, for a given diameter of the optical conductor 46, the central axis of the optical conductor 46 is at a predetermined position (i.e., height within the V-groove adapter). Likewise, the reference facets 36 are configured to provide two lines of contact 64 that support the optical conductor 48 such that, for a given diameter of optical conductor 48, the central axis of the optical conductor 48 is at the same predetermined position as the central axis of the optical conductor 46. Therefore, if the V-grooves 22, 24 are axially aligned, then the central axes of the optical conductors 22, 24 are coaxially aligned. It is noted that various configurations for reference facets 30, 36 other than those presented herein may be utilized to define a V-groove that supports and aligns the central axes of the optical conductors 46, 48 in whatever manner desired.

Design and Fabrication

Figure 5A:
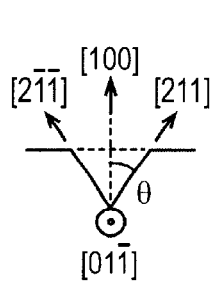
FIGS. 5A and 5B show the crystallography and a stereogram, respectively, of a V-groove etched in a (100) silicon substrate as it is viewed along the [01–1] direction.
Figure 5B:
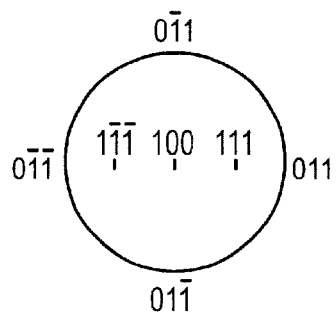

In order to achieve precise alignment of the central axes of the optical conductors 46, 48, and hence, the centers of the cores 50, 52, respectfully, the V-grooves 22, 24 are initially fabricated in a monocrystalline material, such as silicon. The V-grooves 22, 24 can be made with precision in the monocrystalline material utilizing well-known photolithographic masking and etching techniques. In particular, anisotropic etching in monocrystalline material inherently progresses along the crystallographic planes, which permit features to be formed with precise predictability. For instance, as in the presented embodiment, V-grooves fabricated in (100) silicon produce reference facets 30, 36 at a fixed angle of α=70.52°, as illustrated in FIG. 5A Specifically, a suitably masked (100) silicon substrate can be anisotropically etched to create reference facets at a fixed angle a. The resulting V-groove is bounded by the {111} planes, as illustrated in FIG. 5B. It is noted that the etching process can be stopped prior to the two reference facets coming together. This results in a trough or truncated cross-section, as illustrated by V-groove 22 (FIG. 4).

Figure 6:
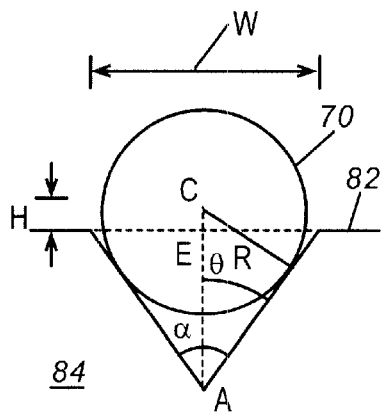
FIG. 6 is a schematic view of an optical conductor supported within a V-groove in accordance with an embodiment of the present invention.

As illustrated in FIG. 6, the height H of the center C of the optical conductor 70 above the top surface 82 of the silicon substrate 84 can be defined by Equation (1) below:

$$H = CE = AC - AE \quad (1)$$
$$= R/\sin\theta - W/2\tan\theta, \text{ where } \theta = \alpha/2 = 35.26°$$
$$= 1.732R - 0.707W$$

Where R is the radius of the optical conductor 70 and W is the width of the V-groove at the top surface 82.

Accordingly, for a given desired height H and a known optical conductor radius R, the corresponding width at the top of the V-groove (i.e., at the top surface of the silicon substrate) can be readily determined using Equation (1) above. Table 1 below provides the widths of the V-grooves (given in micrometers ($\mu$m)) for various predefined heights H (given in $\mu$m), given that one optical conductor has a diameter of 1.25 mm, and the other optical conductor has a diameter of 2.5 mm, as would be the case when interconnecting an CL connector and an ST™ connector.

TABLE 1

| Height (H) | V-Groove Width For Small Diameter Conductor (i.e., 1.25 mm) | V-Groove Width For Large Diameter Conductor (i.e., 2.5 mm) |
| --- | --- | --- |
| 10 $\mu$m | 1516 $\mu$m | 3047.7 $\mu$m |
| 20 | 1502.6 | 3033.6 |
| 30 | 1488.5 | 3019.4 |
| 40 | 1474.4 | 3005.3 |
| 50 | 1460.2 | 2991.5 |
| 100 | 1389.5 | 2920.4 |
| 200 | 1248.1 | 2779 |
| 300 | 1106.7 | 2637.6 |

Figure 7:
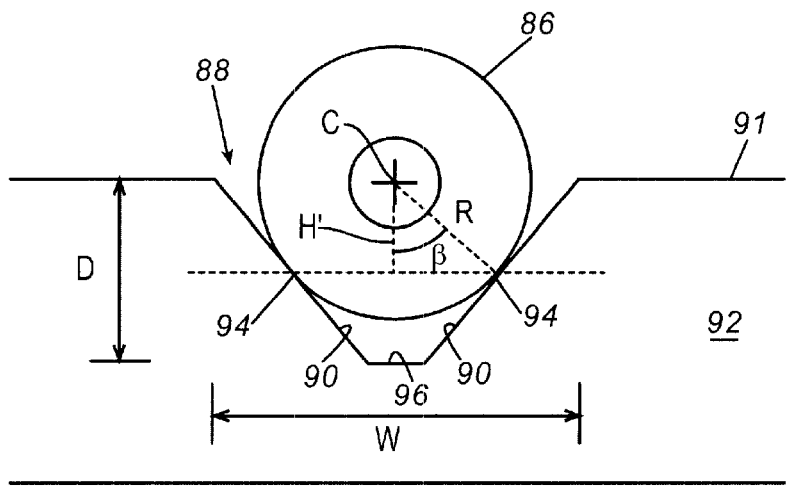
FIG. 7 is a schematic view of an optical conductor supported within a V-groove designed to position the center of the optical conductor in the same plane as the top surface of the V-groove.

FIG. 7 illustrates an embodiment where an optical conductor 86 is supported in a V-groove 88 that is defined by reference facets 90 such that the longitudinal axis of the optical conductor 86 is coaxially aligned with the central axis of the V-groove 88, and is in the same plane with the top &surface 91 of the silicon substrate 92. The height H' of the center C of the optical conductor 86 above the contact points (i.e., the tangent points) 94 can be calculated using Equation (2) below:

$$H = R*\cos\beta, \text{ where } \beta = 54.7° \quad (2)$$
$$= 0.678\,R$$

In addition, as illustrated in FIG. 7, the V-groove 88 does not form a complete V-shaped cross-section, but includes a bottom surface 96 connecting reference facets 90. The V-groove 88 is not completely etched to conserve the structural portion of the silicon substrate 92 below the V-groove 88 and to reduce the overall size of the V-groove adapter. Since the V-groove merely provides two lines of contact on the reference facets, as long as the V-groove is deep enough to receive the optical conductor, the V-groove does not have to be completely formed. That is, the lower portion of the V-groove may be removed without any consequence to performance of the V-groove adapter, and in fact, may be made smaller and more robust without the lower portion of the V-groove. The minimum depth D is approximately the radius R of the optical conductor minus the height of the central axis of the optical conductor above the top surface of the of the silicon substrate (or plus the distance of the central axis of the optical conductor beneath the top surface if the central axis of the optical conductor is below the top surface), plus some added amount of extra clearance, such as 50$\mu$m.

In addition, for an optical conductor of a given diameter D (i.e., 2R, where R is its radius), there exists a maximum V-groove width $W_{max}$ so as to prevent the optical connector from resting on the bottom surface 96, and a minimum V-groove width $W_{min}$ so as to ensure that the optical conductor is supported by the reference facets 90 and is not sitting on the top surface 91, as provided by below in Equations (3) and (4) below:

$$W_{max} = 2R/\sin\beta, \text{ where } \beta = 54.74° \quad (3)$$
$$= 1.225\,D$$

$$W_{min} = 2R*\sin\beta, \text{ where } \beta = 54.74° \quad (4)$$
$$= 0.817\,D$$

The Equations (3) and (4) can be utilized to calculate the appropriate widths for either of the larger V-groove 22 or the smaller V-groove 24 of the V-groove adapter 20 (see FIGS. 1A, 1B, 2A, and 2B).

Once the desired dimensions for the V-grooves have been determined, the V-groove adapter can then be fabricated. In order to make the V-groove adapter low cost, the V-groove adapter may be mass produced using injection molding techniques. However, the V-grooves of the V-groove adapter must be made with great precision in order to accurately align the cores of the optical connectors within acceptable tolerances. Thus, the facets of the V-grooves are precisely etched in a monocrystalline material initially. A metal layer is then formed over the V-grooves in order to form an inverse replica of the V-grooves which is used as an insert in an injection mold, as described below. A detailed discussion of the techniques for making a mold for injection molding of plastics can be found in the book, "Plastics Engineering Handbook of the Society of Plastics Industry, Inc.," Michael L. Barons, editor, Van Norstrand Reinhold, New York, 1991.

Figure 8:
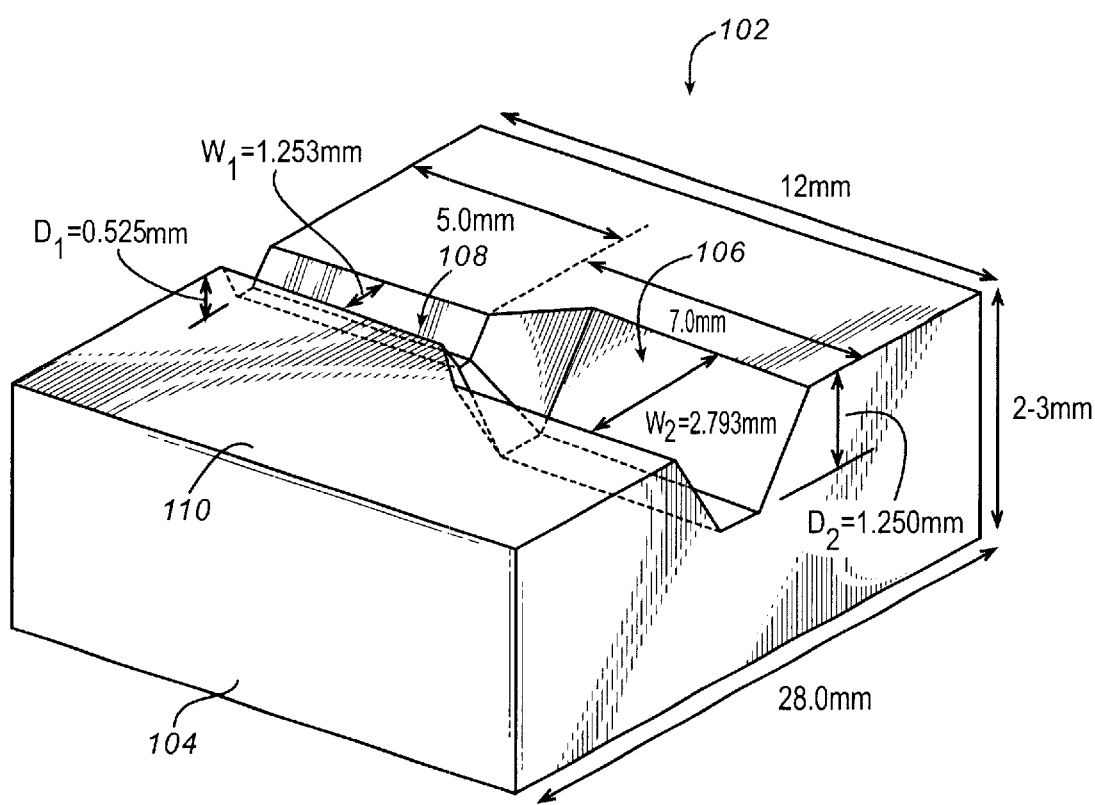
FIG. 8 is a perspective view of a master V-block utilized in making a mold for a V-groove adapter in accordance with an embodiment of the present invention.

With reference to FIG. 8, a master V-block 102 can be fabricated in a monocrystalline material using the design considerations and equations provided above. For example, a silicon substrate 104 can be masked and etched in order to produce a larger V-groove 106 in a predetermined alignment with a smaller V-groove 108. The dimensions provided in FIG. 8 are for interconnecting a 1.25 mm optical conductor to a 2.5 mm optical conductor. The V-grooves 106, 108 can be fabricated in a silicon substrate 104 using conventional photolithographic processes of masking and etching, as is well known. In particular, an etch resistant mask is placed over the top surface 110 of the silicon substrate 104 so as to define windows in the mask of widths $W_1$, and $W_2$ of the V-grooves 106 and 108, respectively. The silicon substrate 104 is then anisotropically etched to create the V-grooves 106, 108, typically using KOH or EDP etchants. In a preferred fabrication technique which utilizes a two level masking procedure, the wider V-groove is etched to a first depth in a first etching step. In the next etching step, the narrower V-groove and the wider V-groove are etched such that at the end of the second etching step, both sized grooves achieve their desired dimensions of width and depth. A more detailed description of the two level masking and etching procedure is provided in U.S. Pat. No. 5,632,908, issued to Shahid and assigned to the assignee of the present invention, and which is incorporated herein by reference as if set forth in full. Alternately, in order to achieve the deeper etch in the V-groove 106, the etching is stopped once a desired depth $D_1$ has been reached in the V-groove 108, and then an etch resistant mask is placed over the V-groove 108 in order to prevent further etching thereof leaving only groove 106 exposed in a subsequent etching step. Thus, the V-groove 106 can be further etched in the subsequent etching step to obtain a desired depth $D_2$ without further etching the V-groove 108. It is known, however, that alternative techniques for obtaining differential V-groove depth may be utilized. For instance, once the grooves 106, 108 have been sufficiently etched to a depth below the lines of contact on the reference facets, then the etch process can be stopped and the mold utilized in the injection molding process may be built up in order to increase the V-groove depth in subsequent processes, as described in application Ser. No. 09/126294, entitled "Method of Making Aligned Grooves in an Optical Connector Support Member," filed in the United States Patent and Trademark Office on Jul. 30, 1998, assigned to the assignee of the present invention, and which is incorporated herein by reference as if set forth in full.

A metal layer is then electroformed onto the master V-block over the V-grooves 106, 108 in order to form an inverse replica of the V-grooves. A suitable metal for such purposes is nickel (Ni). The silicon mesa 104 is then removed or destroyed, by etching in, for example, a solution of KOH in water. The metal layer is then inserted in a mold which defines the remaining configuration of the V-groove adapter 20. A more detailed discussion of how to fabricate injection molds from master silicon substrates is provided in U.S. Pat. Nos. 5,388,174 and 5,603,870, both of which are assigned to the assignee of the present invention.

The injection mold can then be utilized to mass produce V-groove adapters made of plastic. However, plastics are known to shrink during the molding process. Accordingly, to accommodate the shrinkage of the plastic during the subsequent molding process, the V-grooves 106, 108 should be made somewhat larger than is finally intended for the final V-groove adapter 20. It has been determined that the V-grooves 106, 108 in the silicon mesa 104 should be fabricated approximately between 0.4–0.6% larger in order to accommodate the shrinkage in plastic material. Plastic materials with relatively little shrinkage include polyphenylene sulfide (PPS), polyethermide, or liquid crystal polymers.

Accordingly, the masking and etching techniques enable the V-groove widths to be precisely controlled in the master V-blocks. The V-groove adapters fabricated with a mold made from the master V-block can precisely support two optical conductors of dissimilar size (e.g., 1.5 mm and 2.5 mm diameters) so that the centers of the optical conductors (i.e., the longitudinal axes), and hence, the centers of the cores of the optical conductors, are perfectly aligned when placed in their respective V-grooves and pressed against the reference facets of the V-grooves by their respective securing mechanisms.

V-Groove Attenuator

It is well known to those skilled in the art that when mating two optical fiber cores in a fiber optic connection, an offset of the mating optical fiber cores will cause an imperfect transfer of the optical signal from the transmitting optical fiber to the receiving optical fiber. While the amount of signal loss in such an imperfect transfer depends upon various parameters including the relative diameters of the respective cores, it is well accepted that there exists a relationship between the offset of mating cores and the insertion loss. It so happens that while loss attributed to core offset is unwanted, if such loss could be precisely controlled then it may have utility in various applications, such as an optical attenuator.

In fiber optic communication network designs, optical attenuators are used to reduce the power level of an optical signal, as well known in the industry. To date, however, the applicants are not aware of an attenuator capable of precisely and reliably providing low loss levels on the order of less than 3 dB. While loss due to core offset in single-mode fibers have been well documented (see, Marcuse, D. "Loss Analysis of Single-Mode Fiber Splices" BSTC, 56, No. 5 (May–June 1977), pages 703–718), no device known to the applicants has been able to accurately and consistently control the amount of offset with the precision required to provide a predetermined loss, preferably at levels less than 3 dB. For example, to a establish a 1 dB loss, the lateral offset should be approximately 2 $\mu$m in a single-mode fiber. A device capable of providing such an offset accurately and consistently has heretofore not been commercially available.

A V-groove attenuator in accordance with the present invention, however, can be fabricated utilizing the design and fabrication techniques described above to provide an offset with a precision within approximately 1 μm. The V-groove attenuator may be initially designed and fabricated in a silicon substrate in order to create a master V-block preform that offsets the V-grooves formed therein such that when optical conductors are placed in the resulting V-groove attenuator, their respective cores are offset by a predetermined distance. The offset may be vertical, lateral, or both. Furthermore, the mating optical conductors may be of the same or dissimilar size.

Figure 9:
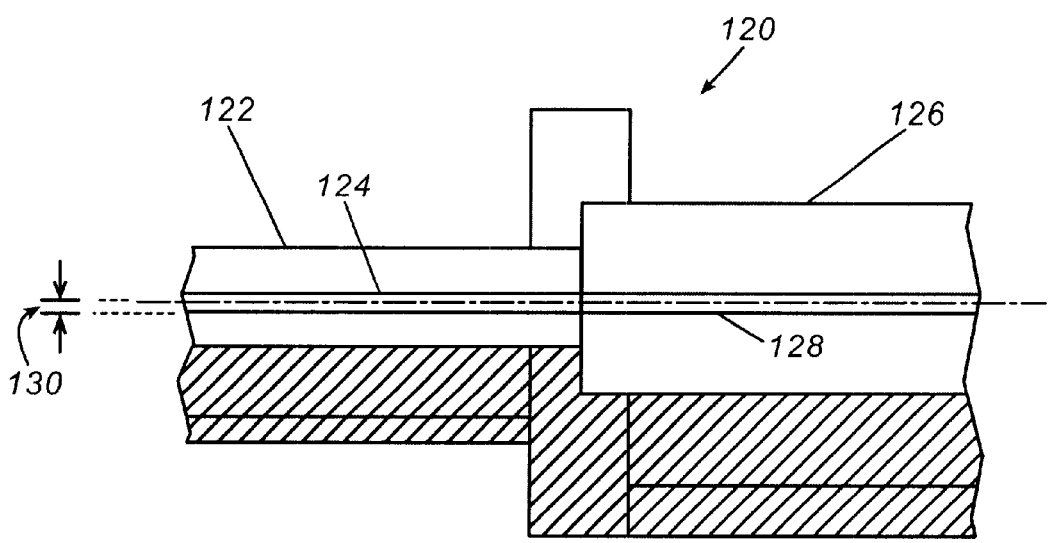
FIGS. 9 and 10 are a fragmentary front cross-sectional views of optical attenuators in accordance with respective embodiments of the present invention, wherein two optical conductors are interconnected using V-grooves such that the cores of the optical conductors are offset by a predetermined amount in order to create a known loss in the interconnection of the two optical conductors.

For example, with reference to FIG. 9, a V-groove attenuator 120 in accordance with the present invention optically interconnects a relatively smaller optical conductor 122 having a core 124 to a relatively larger optical conductor 126 having a core 128. In the cross sectional view of FIG. 9, the vertical offset 130 between cores 124 and 128 is shown. While the optical conductors 122, 126 are of dissimilar size, it will be appreciated by those skilled in the art that similar sized optical conductors may also be interconnected with a predefined offset. Again, by predefining the offset, the reduction of power transmitted from one optical conductor to the other optical conductor can be precisely controlled on a consistently repeatable basis. As will be appreciated by those upon reading the present disclosure, the vertical offset of one optical conductor with reference to the other can be precisely controlled by controlling the relative height of one optical conductor with respect to the other optical conductor. As discussed above, the height of the optical conductor is defined by the width of the V-groove at the top surface of the master V-block.

Figure 10:
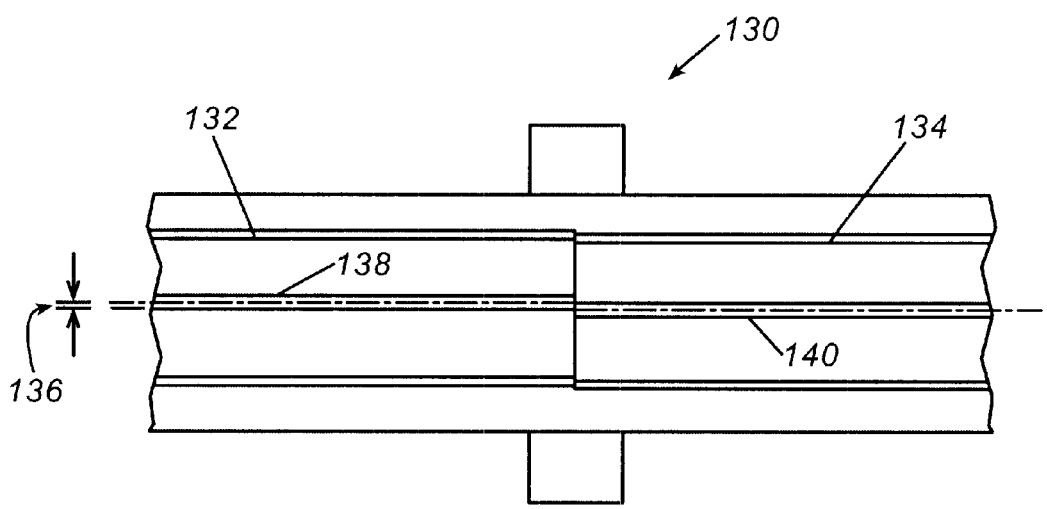

With reference to FIG. 10, a top view of a V-groove attenuator 130 includes a lateral offset. Optical conductors 132 and 134, which are of similar size, are mated together with a predetermined offset 136 so that respective cores 138 and 140 are offset by a known distance. In this embodiment, the lateral offset is precisely controlled by offsetting the axial lines of the V-grooves 132, 134 by the desired offset 136. The axial lines of the V-grooves 132, 134 can be precisely controlled by the masking and etching techniques described above when forming the master V-block.

Accordingly, the present invention provides for a V-groove attenuator having a vertical or lateral (or both) offset of a predetermined distance for accurately controlling the loss, and thus, the signal reduction.

Offset Launch V-Groove

It has been recognized that the splice performance in bandwidth, skew/jitter and loss may be improved if the optical signal from a single-mode fiber is launched in a multimode fiber so as to partially fill the optical modes of the multimode optical fiber. One method of achieving the improved link performance is by using a single-mode fiber pig-tail of an optical transmitter module to connect to the input side of a multimode fiber such that the centers of the single-mode and multimode fibers are misaligned by a predetermined offset. This is referred to as an offset launch condition which underfills a multimode fiber and excites only annular modes that then propagate without appreciable degradation within the multimode fiber. However, offset launch conditions for enhancing the bandwidth performance of a multimode optical fiber have been difficult to achieve because of the inability to provide the precise offset that can be reproduced consistently to produce the desired launch condition.

Figure 11:
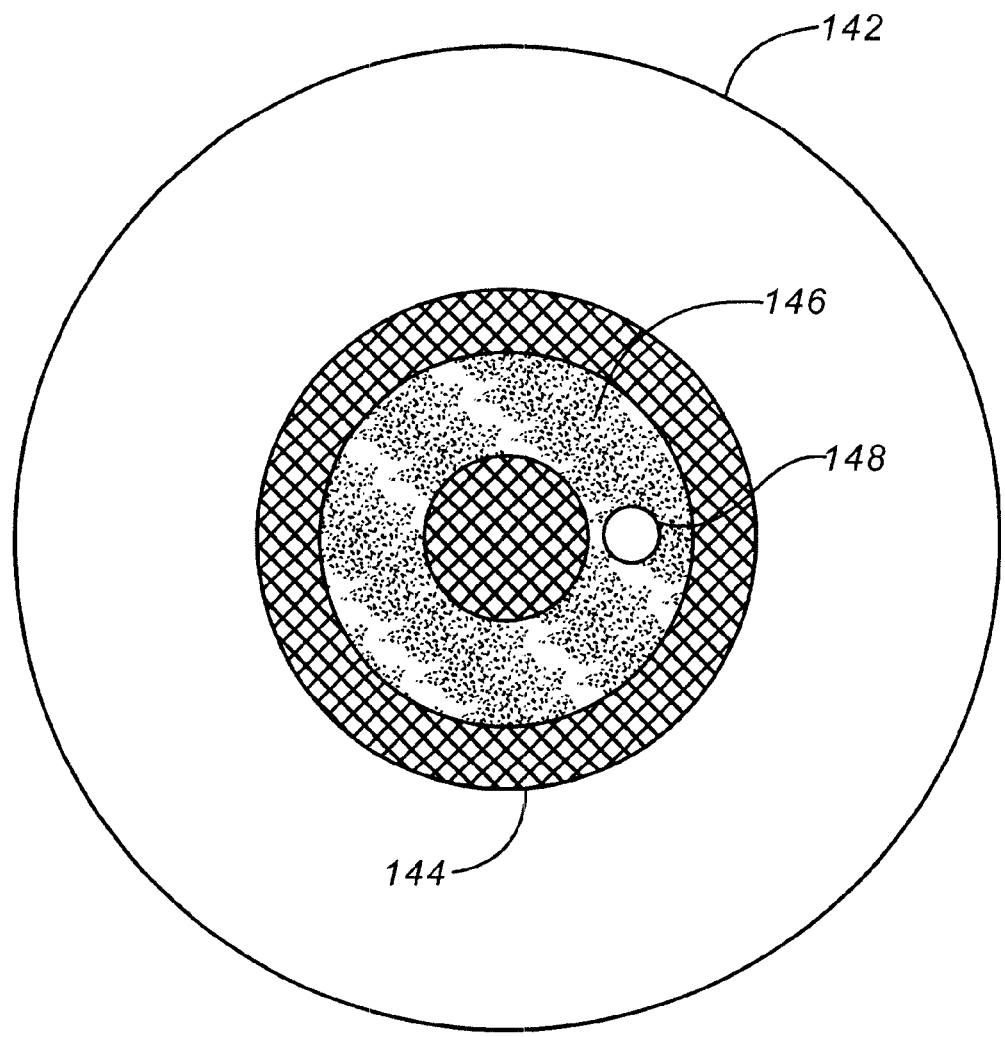
FIG. 11 is a schematic illustration of the launch area of a multimode optical fiber for an offset launch condition.

For example, with reference to FIG. 11, for a receiving multimode fiber 142 that includes a core 144 having a radius of 31.25 μm, the desired offset launch region 146 into the multimode fiber core 144 extends from approximately 13 μm to approximately 27 μm from the center of the core of the multimode fiber, which translates into a core offset of between approximately 17 μm to 23 μm for a launching single-mode fiber (assuming a 8–9 μm diameter). In the case of a multimode fiber having a core radius of 25 μm, the desired launch area of the multimode fiber core extends from approximately 6 μm to approximately 20 μm from the center of the core of the multimode fiber, which translates into a core offset of between approximately 10 μm to 16 μm for a launching single-mode fiber (assuming a 8–9 μm diameter). For illustrative purposes, the core of a launching (or transmitting) single-mode fiber 148 is shown in a position for an offset launch into the multimode fiber 142. Thus, there is an offset launch region 146 of the core 144 of the multimode fiber into which the optical signal should be launched, and thus, where the transmitting (i.e., launching) single-mode fiber should be positioned.

Figure 12:
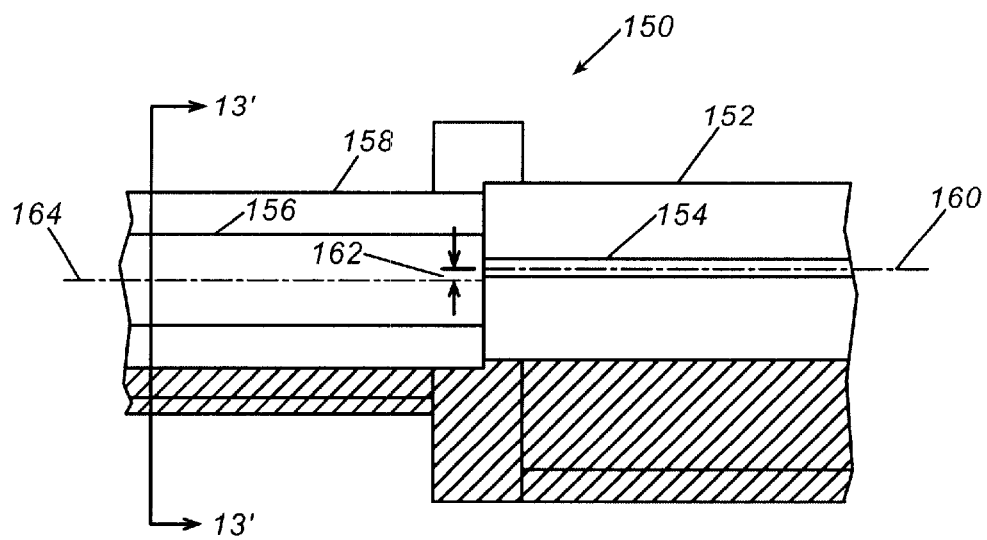
FIG. 12 is a fragmentary front cross-sectional view of two optical conductors connected utilizing a V-groove adapter in accordance with an embodiment of the present invention so as to create an offset launching condition, wherein the offset is vertical.
Figure 13:
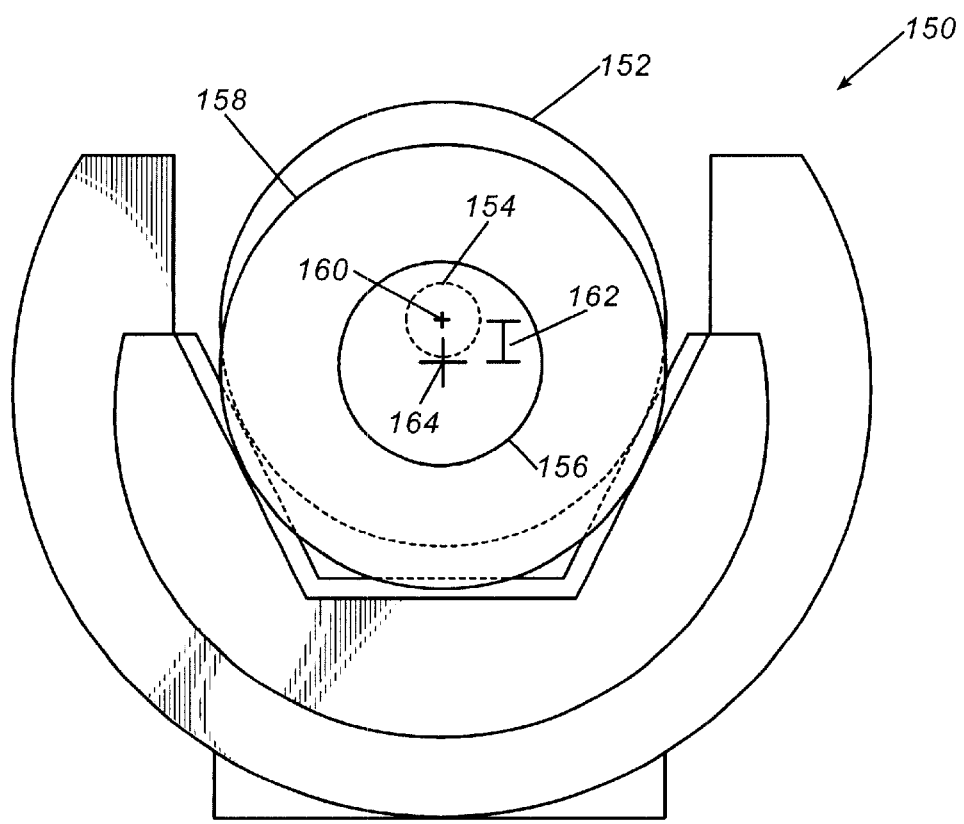
FIG. 13 is a side elevational view of the two optical conductors of FIG. 12 which are connected utilizing a V-groove adapter in accordance with an embodiment of the present invention so as to create an offset launch condition using a vertical offset.

An offset launch V-groove adapter 150 in accordance with the present invention provides a vertical offset that places a first optical conductor 152 having a single-mode core 154 within the desired launch area of the multimode core 156 of the second optical conductor 158, as illustrated in FIGS. 12 and 13. As illustrated, the central axis 160 of core 154 is offset by a predetermined distance 162 from the central axis 164 of core 156. As discussed above, the offset launch region can be precisely designed using a master V-block fabricated in accordance with the methods described above. Advantageously, since the V-groove is electroformed with a metal layer to form an insert for an injection mold, the offset launch V-groove adapter 150 may comprise plastic V-groove portions which are low cost since they can be mass produced.

Figure 14:
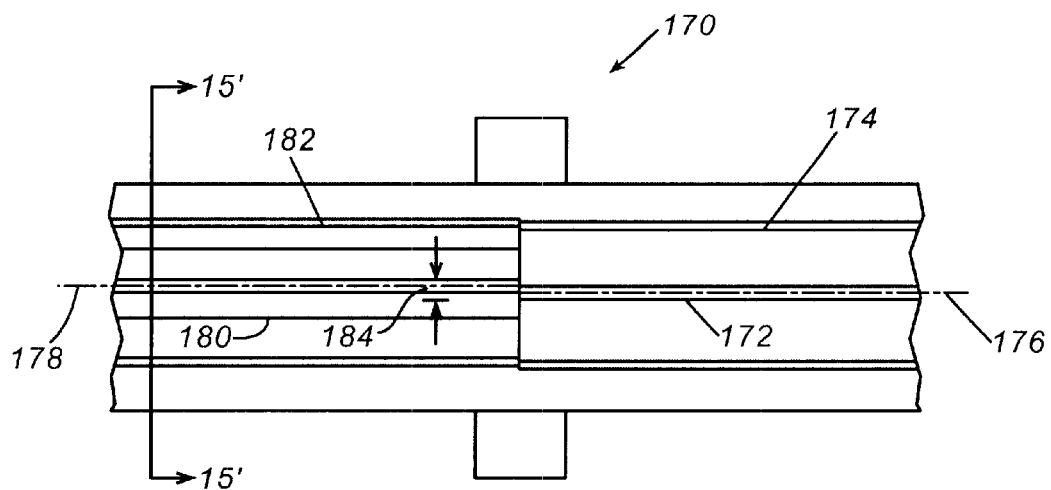
FIG. 14 is a fragmentary top cross-sectional view of two optical conductors connected utilizing a V-groove adapter in accordance with an embodiment of the present invention so as to create an offset launch condition, wherein the offset is lateral.
Figure 15:
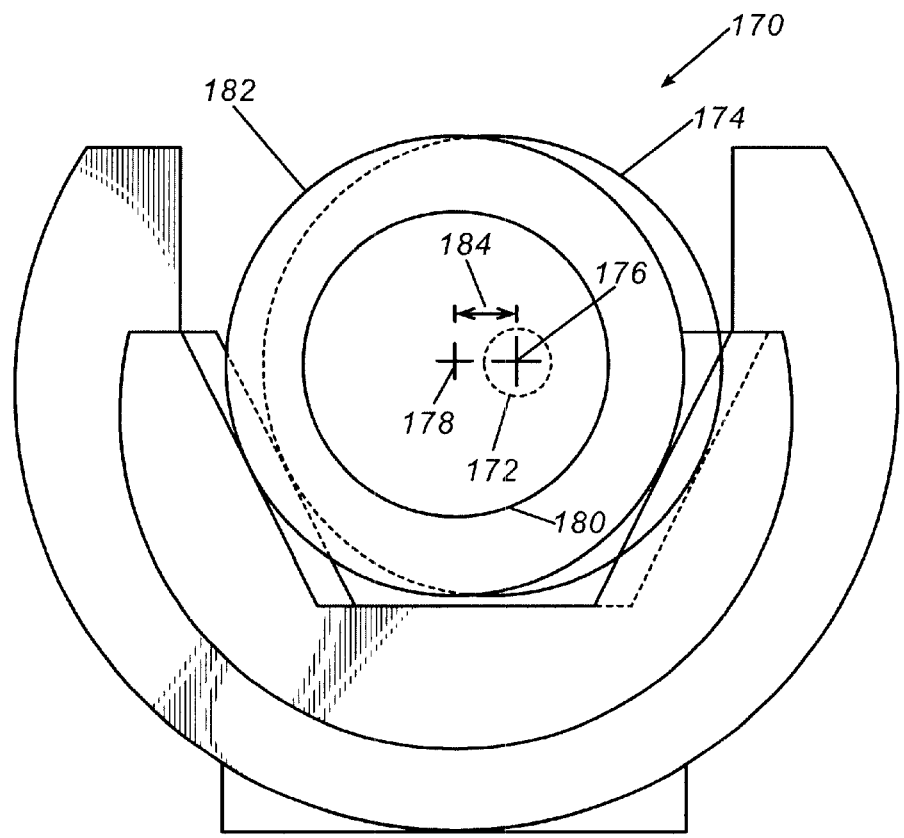
FIG. 15 is a side elevational view of the two optical conductors of FIG. 14 which are connected utilizing a V-groove adapter in accordance with an embodiment of the present invention so as to create a offset launch condition utilizing a lateral offset.

With reference to FIGS. 14 and 15, an offset launch V-groove adapter 180 provides an offset launch in the lateral direction. As shown, a single-mode core 172 of a first optical connector 174 has a central axis 176 that laterally offset with respect to the central axis 178 of the multimode core 180 of the second optical connector 182. The offset 184 can be precisely controlled when forming the master V-block preform as discussed above. It is further noted that the offset may be in both the vertical and lateral directions.

Many modifications and other embodiments of the invention will come to mind to one skilled in the art to which this invention pertains having the benefit of the teachings presented in the foregoing description and the associated drawings. Therefore, it is understood that the invention is not to be limited to the specific embodiments disclosed and that modifications and other embodiments are intended to be included within the scope of the appended claims. Although specific terms are employed herein, they are used in a generic and descriptive sense only, and not for purposes of limitation.

Wherefore, the following is claimed:

1. An optical fiber adapter, comprising:
   a first alignment member defining a first V-groove of a first width adapted to support therein a first optical conductor, wherein said first optical conductor includes a first central axis; and
   a second alignment member defining a second V-groove of a second width proximate and axially aligned with sad first V-groove, and wherein said second V-groove is adapted to support therein a second optical conductor, wherein said second optical conductor includes a second central axis;
      wherein said first width and said second width are different and said first V-groove and said second V-groove are configured to support said first and second optical conductors in a mating relationship which includes a predetermined degree of alignment of said first central and said second central axis.

2. The optical adapter of claim 1, wherein said first optical conductor has a first diameter and said second optical conductor has a second diameter, wherein said first diameter and said second diameter are of dissimilar size.

3. The optical adapter of claim 1, wherein said predetermined alignment includes coaxial alignment of said first central axis and said second central axis.

4. The optical adapter of claim 1, wherein said predetermined alignment includes an offset alignment of said first central axis and said second central axis.

5. The optical adapter of claim 1, wherein said first V-groove comprises a trough cross-section.

6. The optical adapter of claim 1, wherein said first V-groove includes a third central axis and said second V-groove includes a fourth central axis, and wherein said first V-groove and said second V-groove are configured to support said first and second optical conductors so that said first and said second central axes are coaxial with said third and fourth central axes, respectively.

7. The optical adapter of claim 1, wherein said first V-groove includes a third central axis and said second V-groove includes a fourth central axis, and wherein said first V-groove and said second V-groove are configured to support said first and second optical conductors so that said first and said second central axes are an in an offset axial alignment with said third and fourth central axes, respectively.

8. The optical adapter of claim 1, wherein said first optical conductor has a diameter of approximately 1250 micrometers and said second optical conductor has a diameter of approximately 2500 micrometers.

\* \* \* \* \*